United States Patent Office 3,494,823
Patented Feb. 10, 1970

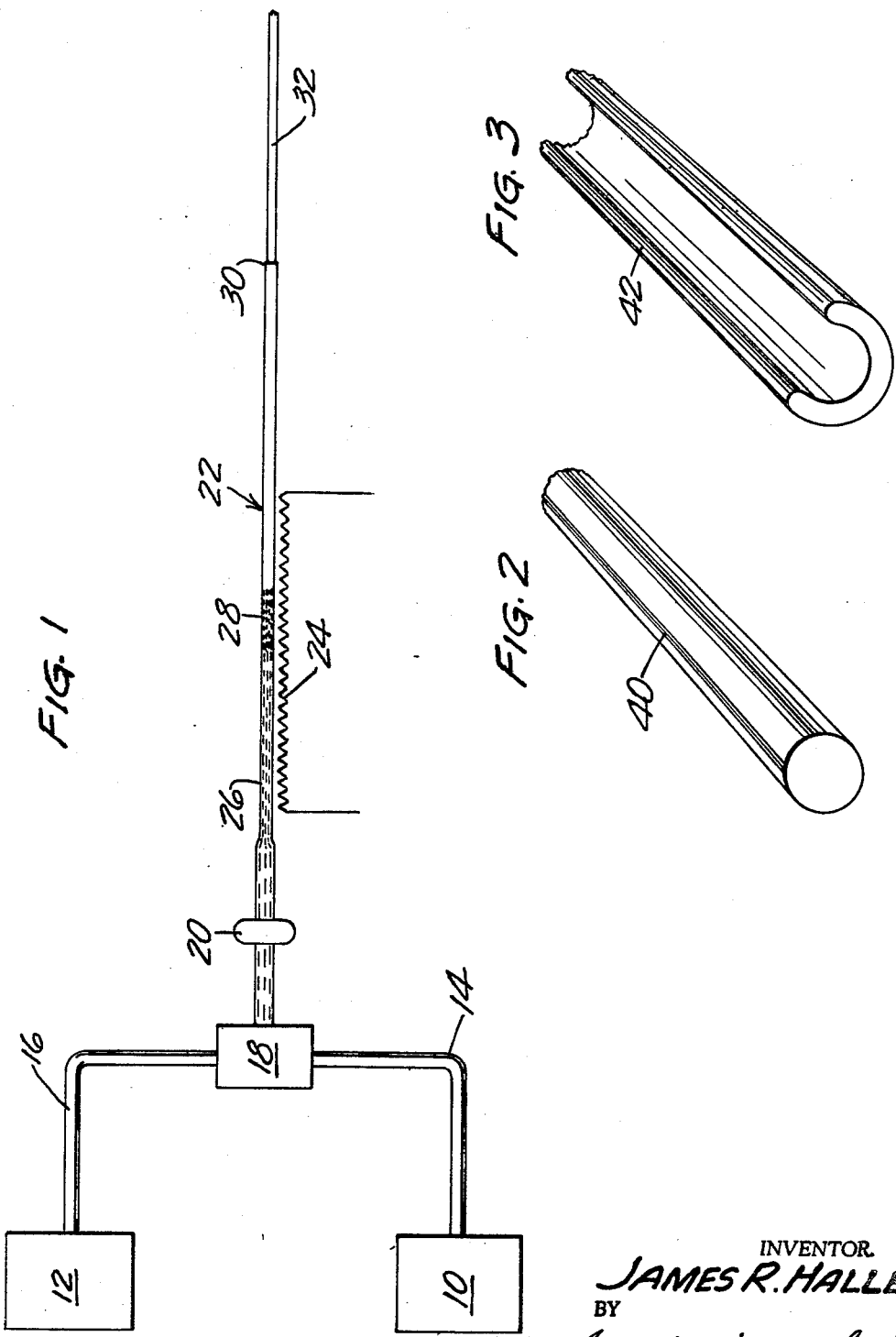

3,494,823
SHAPED POLYIMIDES AND METHOD
James R. Haller, St. Paul, Minn., assignor to Minnesota Mining and Manufacturing Company, St. Paul, Minn., a corporation of Delaware
Filed Jan. 17, 1967, Ser. No. 609,905
Int. Cl. D02g 3/22
U.S. Cl. 161—181
11 Claims

ABSTRACT OF THE DISCLOSURE

A process for forming elongated polyimide shapes of large cross section in which a polyamide acid, dehydrating agent, and catalyst are mixed together and reacted in an elongated conduit to form a single phase self-supporting gel which may be dried and marketed in semi-cured form or fully cured form of tough thermally stable articles.

---

This invention relates to a method of producing elongated polyimide shapes of large cross section and to semi-cured and fully cured shaped objects so produced.

Polyimide resins have become commercially significant due to their outstanding chemical, physical, and particularly their thermal stability and electrical properties. The polyimides are characterized by a recurring unit having the following structural formula:

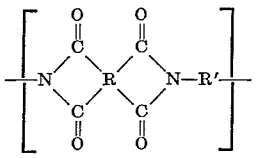

wherein R is a tetravalent radical containing at least six carbon atoms in a ring, said ring characterized by benzenoid unsaturation, the four carbonyl groups being attached to separate carbon atoms, and each pair of carbonyl groups being attached to adjacent carbon atoms in a six-membered benzenoid ring of the R radical; and wherein R' is a divalent organic radical containing at least two carbon atoms.

Methods for forming polyimides by dehydration of polyamide-acids have been disclosed; see, for example, U.S. Patent 3,179,614 (Edwards) issued Apr. 20, 1965; U.S. Patent 3,179,630 (Endrey) issued Apr. 20, 1965; or U.S. Patent 3,179,631 (Endrey) issued Apr. 20, 1965; or British Patent 1,038,738, issued Aug. 10, 1966. Reference is made to these patents for the methods of preparing the polymers and the various reactants, e.g. comonomers, dehydrating agents, additives, plasticizers and the like, which may be used in addition to those preferred herein.

Filaments have previously been formed from polyimides by spinning a polyamide-acid into a solution containing a dehydrating agent to convert the polyamide-acid into a polyimide. Another method of forming shaped objects has involved mixing together the polyamide-acid with a dehydrating agent (and generally a catalyst for the dehydration), shaping the polyamide-acid by extrusion, and supporting the extruded shape, generally a film, on a traveling belt or other traveling supporting surface during conversion of the polyamide-acid to a self-supporting form. These prior art methods impose severe limitations on the types of products which can be produced. For example, in the spinning process the cross section is severely limited since diffusion of the dehydrating agent into the filament must be relied on to permit dehydration of the polyamide-acid to occur. The dehydrating reactants will not diffuse within a practical length of time through filaments of more than a very limited diameter. Moreover the liquid portion of the filament adjacent the spinneret is incapable of supporting the weight of large diameter filaments without breaking. The extrusion process referred to above is also limited to thin cross sections due to the difficulty of supporting anything other than thin films on a traveling belt. Larger cross sections would simply flow off the carrier belt, or if retained at the sides would not retain a desired shape, particularly on the top surface thereof.

It is an object of the present invention to provide a method for forming polyimide structures of uniform cross section in substantially larger cross sections than hitherto possible and in cross sections of any desired shape. In accordance with the present invention large diameters of rods, tubes, and irregular shapes such as U-shaped channels can be formed rapidly and on a continuous basis. The present invention further eliminates the need for complex equipment such as traveling supporting means required by the prior art. The shaped articles of this invention are sufficiently pliable in a semi-cured state prior to final cure so that they can be further deformed into various useful shaped articles. For example, a semi-cured rod formed in accordance with this invention can be wound on a mandrel to form a helix which can be finally cured to form a tough flexible polyimide spring. The semi-cured articles with solvent removed may be marketed as such or may be fully cured to form tough thermally stable articles.

The objects of this invention are attained by mixing a polyamide-acid and a dehydrating agent therefor (generally with a catalyst) in a volatile organic solvent, causing this mixture to flow through an elongated conduit of uniform cross section, dehydrating the polyamide-acid as it flows through the conduit to form a self-sustaining transparent polyimide gel and removing the volatile solvent from the resulting shaped object after the gel has been removed from the end of the conduit. Final cure is accomplished by heating the gel to convert any residual polyamide-acid to a polyimide. It is believed that some molecular rearrangement of the polymer also occurs because a marked improvement of physical properties is observed. The preferred polyimide for forming the shaped objects of this invention is poly bis(4 aminophenyl) ether pyromellitimide, but other polyimides, whose corresponding polyamide-acids which when reacted with a dehydrating agent result in the formation of a transparent, i.e., single phase polyimide gel in a solvent, can be used instead.

The invention will be further explained with reference to the accompanying drawings wherein:

FIGURE 1 is a diagrammatic view illustrating the process of this invention,

FIGURE 2 is an enlarged broken-away perspective view of an elongated shape of this invention, and FIGURE 3 is an enlarged broken-away perspective view of an elongated shaped article produced in accordance with a further embodiment of the invention.

In FIGURE 1 is shown a supply means 10 containing polyamide-acid in a solvent and another supply means 12 containing a dehydrating agent and catalyst for the polyamide-acid. The polymer and curing solutions are fed by conduits 14 and 16 into mixer 18 in controlled amounts. After thorough mixing the polymer and curing agent are fed by means of a suitable pump 20 into elongated conduit 22. Conduit 22 is heated by a suitable means 24 such as a water bath, electrical heating jacket, hot air, or any means which will maintain a reasonably uniform temperature. The reaction mixture remains liquid in portion 26 of conduit 22 nearest pump 20. Gelation of the reaction mixture occurs in the relatively short portion 28 of the conduit 22. The gelation zone 28 may shift slightly lengthwise during a given run as conditions fluctuate slightly. Conduit 22 should be of uniform cross section from the area of gelation 28 to the end 30 from which shaped swollen gel 32 is removed.

Shaped gel 32 is then heated in order to remove volatile solvents therefrom. Optionally, the solvent may be removed by first leaching with another liquid before heating. Such leaching is thought to remove residual catalysts or impurities, thus improving the quality of the products.

In FIGURES 2 and 3 are shown portions of elongated shaped articles 40 and 42 which illustrate the many varied cross sections which can be formed. It will be apparent to those skilled in the art that many other cross sections can likewise be formed, for example, hollow tubes, rectangles, and irregular cross sections, if desired for special purposes.

Any combination of reactants in a solvent in which the resulting polyimide will form a transparent gel may be used in practicing the present invention. A particularly preferred polyamide-acid is that produced by the reaction of 4,4'-diaminodiphenylether and pyromellitic dianhydride, because the polyimide, poly bis (4 aminophenyl) ether pyromellitimide forms a single phase gel, i.e., a clear gel in the absence of fillers, pigments, etc., in various volatile organic solvents such as dimethylacetamide, dimethylformamide, etc. This polyimide is also preferred because of its excellent physical strength and thermal properties. Both the polyamide-acid and the dehydrating agent containing the catalyst are dissolved in a volatile organic solvent, generally the same solvent, it being preferred to use a sufficient amount of solvent to dissolve all of the materials and form a solution of easily workable viscosity.

The preferred dehydration catalyst is pyridine, but other tertiary amine catalysts may be substituted, as will be recognized by those skilled in the art. It is preferred to carry out the dehydration step at a temperature between about 25° C. and 100° C. in order that the gelation will occur within a sufficiently short time to make practical conduit lengths possible, while, on the other hand avoiding degradation of the reactants or boiling of the solvents.

The process of this invention is suitable preferably for forming shapes of relatively large cross section, i.e., circular cross sections of at least 0.5 mm. diameter or irregular cross sections having a minimum cross sectional dimension of at least about 0.5 mm. In general the problems associated with pumping of the reactants and semi-cured products through conduits of smaller cross section in addition to the fact that the large articles are desirable but not hitherto available, make the large dimension articles greatly preferred. The shapes of this invention can be reduced in diameter by drawing down the elongated shapes in either the semi-cured or fully cured state. Thus filaments 0.1 mm. or less in diameter can be formed.

As will be illustrated by the accompanying examples, it has further been discovered that the physical strength of the shaped articles of this invention are improved by maintaining the articles under tension, for example 200 p.s.i., while the final cure is carried out.

The invention will be further illustrated by the following examples wherein all parts are given by weight unless otherwise indicated.

Example I

A 10% by weight solids polyamide-acid solution based on approximately equimolar amounts of 4,4'-diaminodiphenyl ether and pyromellitic dianhydride was prepared by mixing the following ingredients:

| | Parts |
|---|---|
| 4,4'-diaminodiphenylether | 2906 |
| Pyromellitic dianhydride | 3153 |
| Dimethylacetamide (solvent) | 54,244 |

The Brookfield #4 spindle viscosity of the solution was 120,000 centipoises at 23° C., and the inherent viscosity of the solution was $$274 = \frac{\text{natural logarithm} \frac{\text{Viscosity of solution}}{\text{Viscosity of solvent}}}{\text{Concentration, gm. polymer per 100 ml. solution}}$$

A stream of the polyamide acid solution was pumped at a uniform rate into a mixing chamber wherein it was thoroughly mixed with another stream containing 251 parts by volume acetic anhydride, 139 parts by volume pyridine (catalyst), and 510 parts by volume dimethylacetamide. The flow rates of the streams were adjusted to provide 1.5 moles of acetic anhydride and 1.0 mole of pyridine per carboxyl equivalent of polyamide acid. The volumetric flow rate of polyamide-acid solution was 21.9 cc./min., while that of the other stream was 5.48 cc./min. Air was completely excluded from the system. The mixture was caused to flow from the mixing chamber into a tube of a copolymer of hexafluoropropylene and tetrafluoroethylene (Teflon FEP) nine feet in length, seven feet of which were immersed in a water bath at 74° C. The inner diameter of the tubing was 0.094 inch (2.39 mm.). While passing through the heated section of the tubing the mixture gelled, forming a swollen monofilament. Liquid was exuded from the gel, permitting the monofilament to slide easily through the remainder of the tube. As the filament was removed from the tube it was collected on a drum.

A six-foot length of this swollen monofilament was supported loosely by the ends and was allowed to dry in air at 23° C. for 16 hours. During this period the greater portion of the liquid in the filament evaporated, and its diameter was greatly decreased. A segment of this filament was then clamped in a stainless steel frame and was heated in a forced-air oven to a temperature of 315° C. About 40 minutes were required to raise the oven temperature from 23° C. to 315° C., and the filament was allowed to remain in the oven at 315° C. for an additional 15 minutes before removal. The filament was found to be golden in color and translucent. The following tensile properties were exhibited when tested at 23° C. at an extension rate of 20% per minute:

| | | |
|---|---|---|
| Tenacity | grams/denier | 3.17 |
| Initial modulus | do | 36.1 |
| Ultimate elongation | percent | 66.1 |

The remainder of the swollen monofilament was passed continuously through a 150° C. forced-air oven at a speed sufficient to allow a residence time in the oven of 2.5 minutes. Subsequent passes at the same speed were made at oven temperatures of about 200° C. and 315° C. The round filament emerging from the 315° C. pass was also found to be strong and flexible. It had a diameter of 0.56 mm. (3215 denier) and was capable of being knotted tightly without breaking.

Example II

A swollen monofilament was produced by passing a mixture prepared as in Example I through an eight foot section of 0.25 inch inner diameter polyethylene tubing, six feet of which were immersed in a water bath at 66° C. A section of the resulting swollen monofilament was exposed to air at 23° C. for 16 hours, resulting in a sharp reduction in filament diameter. The filament was supported at one end from the top of a forced air oven, and a weight was attached to the other end to keep the filament under stress. As in Example I, the oven was heated to 315° C., and the filament was allowed to remain at 315° C. for 15 minutes before removal. The diameter of the round filament was found to be 1.4 mm. and the density of the filament was found to be 1.41 grams/cm.³. This corresponds to a denier value of 19,400. The stress applied to the filament while in the oven was calculated to be 190 p.s.i. The following tensile data was taken:

Tenacity _____ gms./denier__ 1.82
Elongation _____ percent__ 40.0

Another filament, prepared in exactly the same manner but without benefit of the applied stress during the oven heating cycle, exhibited the following tensile values:

Tenacity _____ gms./denier__ 1.28
Elongation _____ percent__ 37.5

Example III

A swollen monofilament was produced by the method of Example I. A section of this monofilament was steeped in dioxane at 95° C. for one hour. This leached sample and an untreated sample were clamped in stainless-steel frames and were heated to 315° C. in a forced air oven for 15 minutes. The following tensile properties were measured:

|  | Tensile strength, g./denier | Ultimate elongation, percent | Tensile modulus, g./denier |
|---|---|---|---|
| Leached sample | 1.66 | 89 | 19.6 |
| Control sample | 1.39 | 46 | 20.2 |

Thus it is seen that the removal of solvents by leaching with another solvent produces a significant increase in the properties of the shaped articles.

What is claimed is:

1. A method for forming strong, flexible, elongated polyimide shaped articles of uniform cross section comprising mixing a polyamide-acid and a dehydrating agent therefor in a volatile organic solvent, causing the mixture to flow through an elongated conduit of uniform cross section, dehydrating said polyamide-acid as it flows through said conduit to form a self-sustaining single phase polyimide gel, continuously removing the gel from the end of said conduit and removing the volatile solvent from the resulting shape.

2. A method according to claim 1 wherein said solvent is removed by extraction with a second solvent followed by evaporation of the second solvent from the shape.

3. A method according to claim 1 wherein said shape is finally cured by heating.

4. A method according to claim 3 wherein said shape is held under tension during said final cure.

5. A method for forming strong, flexible, thermally stable, elongated shapes of uniform cross section of poly bis(4-aminophenyl) ether pyromellitimide comprising forming a solution of the polyamide-acid of 4,4'-diaminodiphenyl ether and pyromellitic dianhydride, an anhydride and a tertiary amine catalyst, in a volatile organic solvent, flowing the solution through an elongated stationary conduit of uniform cross section at a temperature of about 25° C. to about 100° C. for a time sufficient to form a single phase, self-sustaining, solvent swollen gel, continuously removing the shaped gel from the end of said conduit, removing the solvent from said gel, and heating said shaped gel to form a strong, flexible elongated polyimide shape.

6. A method according to claim 5 wherein said conduit is of circular cross section.

7. A method according to claim 6 wherein said conduit is greater than about 0.5 mm. in diameter.

8. An elongated thermally stable strong, flexible, poly bis(4-aminophenyl) ether pyromellitimide shape of uniform cross section having a minimum cross sectional dimension of at least about 0.5 mm.

9. A pliable elongated semi-cured polyimide shaped article of uniform cross section having a minimum cross sectional dimension of at least about 0.5 mm., said article being convertible to a tough thermally stable shape by application of heat.

10. A shaped article according to claim 9 wherein said polyimide is poly bis(4-aminophenyl) ether pyromellitimide.

11. An elongated shape of uniform cross section according to claim 8 wherein said cross section is circular.

References Cited

UNITED STATES PATENTS 2,747,222 5/1956 Koch et al.
3,179,633 4/1965 Endrey _____ 161—189

ROBERT F. BURNETT, Primary Examiner
LINDA M. CARLIN, Assistant Examiner

U.S. Cl. X.R.
264—165